United States Patent
Sakhnini et al.

(10) Patent No.: US 12,418,372 B2
(45) Date of Patent: Sep. 16, 2025

(54) MULTI-SLOT SOUNDING REFERENCE SIGNAL (SRS) RESOURCE

(71) Applicant: QUALCOMM Incorporated, San Diego, CA (US)

(72) Inventors: Iyab Issam Sakhnini, San Diego, CA (US); Mahmoud Taherzadeh Boroujeni, San Diego, CA (US); Tao Luo, San Diego, CA (US); Wanshi Chen, San Diego, CA (US); Peter Gaal, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 17/447,611

(22) Filed: Sep. 14, 2021

(65) Prior Publication Data

US 2022/0085944 A1 Mar. 17, 2022

Related U.S. Application Data

(60) Provisional application No. 63/078,670, filed on Sep. 15, 2020.

(51) Int. Cl.
*H04L 5/00* (2006.01)
*H04B 1/713* (2011.01)
*H04W 72/0446* (2023.01)

(52) U.S. Cl.
CPC .......... *H04L 5/0048* (2013.01); *H04B 1/713* (2013.01); *H04W 72/0446* (2013.01)

(58) Field of Classification Search
CPC ... H04L 5/0048; H04L 5/0094; H04L 5/0051; H04L 5/0012; H04B 1/713; H04W 72/0446

See application file for complete search history.

(56) References Cited

U.S. PATENT DOCUMENTS

2019/0013909 A1 1/2019 Li et al.
2019/0109732 A1 4/2019 Choi et al.
(Continued)

FOREIGN PATENT DOCUMENTS

CN 110431786 A 11/2019
CN 110945824 A 3/2020

OTHER PUBLICATIONS

CATT: "Remaining Issues on Long PUCCH Formats", 3GPP TSG RAN WG1 Meeting #92, 3GPP Draft, R1-1801732, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051397713, 5 Pages, Retrieved from the Internet: URL: http://www.3gpp.org/ftp/tsg%5Fran/WG1%5FRL1/TSGR1%5F92/Docs/ [retrieved on Feb. 17, 2018] figures 1, 2, section 2, the whole document.

(Continued)

*Primary Examiner* — Ivan O Latorre
(74) *Attorney, Agent, or Firm* — Guang Y. Zhang; Patterson & Sheridan LLP

(57) ABSTRACT

Certain aspects of the present disclosure provide techniques for a multi-slot sounding reference signal (SRS) resource. A method that may be performed by a user equipment (UE) includes receiving a configuration of an SRS resource, wherein the SRS resource comprises a set of symbols for transmission of SRS across a plurality of slots, and transmitting the SRS using the set of symbols across the plurality of slots to a base station.

26 Claims, 11 Drawing Sheets

(56) References Cited

U.S. PATENT DOCUMENTS

| | | | |
|---|---|---|---|
| 2020/0220679 A1* | 7/2020 | Liu .................... | H04W 72/12 |
| 2020/0235881 A1* | 7/2020 | Choi .................... | H04B 1/713 |
| 2021/0083825 A1* | 3/2021 | Choi .................... | H04L 1/06 |
| 2021/0135808 A1* | 5/2021 | Choi .................... | H04L 5/0048 |
| 2023/0199529 A1* | 6/2023 | Koskela ............... | H04W 24/04 |
| | | | 370/216 |
| 2023/0224124 A1* | 7/2023 | Nilsson ............... | H04L 5/0051 |
| | | | 370/330 |
| 2024/0014960 A1* | 1/2024 | Khoshnevisan ...... | H04L 5/0048 |
| 2024/0048175 A1* | 2/2024 | Chen .................... | H04L 5/0048 |

OTHER PUBLICATIONS

International Search Report and Written Opinion—PCT/US2021/071458—ISA/EPO—Dec. 23, 2021.

* cited by examiner

MULTI-SLOT SOUNDING REFERENCE SIGNAL (SRS) RESOURCE

CROSS-REFERENCE TO RELATED APPLICATION

This application claims benefit of and priority to U.S. Provisional Application No. 63/078,670 filed Sep. 15, 2020, which is hereby expressly incorporated by reference herein in its entirety as if fully set forth below and for all applicable purposes.

INTRODUCTION

Aspects of the present disclosure relate to wireless communications, and more particularly, to techniques for channel sounding.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for sounding.

Certain aspects of the subject matter described in this disclosure can be implemented in a method for wireless communication by a user equipment (UE). The method generally includes receiving a configuration of a sounding reference signal (SRS) resource, wherein the SRS resource comprises a set of symbols for transmission of SRS across a plurality of slots, and transmitting the SRS using the set of symbols across the plurality of slots to a base station.

Certain aspects of the subject matter described in this disclosure can be implemented in a method for wireless communication. The method generally includes transmitting, to a UE, an indication of a configuration for an SRS resource, wherein the SRS resource comprises a set of symbols for transmission of SRS across a plurality of slots; and receiving, from the UE, the SRS using the set of symbols across the plurality of slots.

Certain aspects of the subject matter described in this disclosure can be implemented in an apparatus for wireless communication by a UE. The apparatus generally includes a memory, and one or more processors coupled to the memory, the memory and the one or more processors being configured to receive a configuration of an SRS resource, wherein the SRS resource comprises a set of symbols for transmission of SRS across a plurality of slots, and transmit the SRS using the set of symbols across the plurality of slots to a base station.

Certain aspects of the subject matter described in this disclosure can be implemented in an apparatus for wireless communication. The apparatus generally includes a memory, and one or more processors coupled to the memory, the memory and the one or more processors being configured to transmit, to a UE, an indication of a configuration for an SRS resource, wherein the SRS resource comprises a set of symbols for transmission of SRS across a plurality of slots; and receive, from the UE, the SRS using the set of symbols across the plurality of slots.

Certain aspects of the subject matter described in this disclosure can be implemented in an apparatus for wireless communication by a UE. The apparatus generally includes means for receiving a configuration of an SRS resource, wherein the SRS resource comprises a set of symbols for transmission of SRS across a plurality of slots, and means for transmitting the SRS using the set of symbols across the plurality of slots to a base station.

Certain aspects of the subject matter described in this disclosure can be implemented in an apparatus for wireless communication. The apparatus generally includes means for transmitting, to a UE, an indication of a configuration for an SRS resource, wherein the SRS resource comprises a set of symbols for transmission of SRS across a plurality of slots; and means for receiving, from the UE, the SRS using the set of symbols across the plurality of slots.

Certain aspects of the subject matter described in this disclosure can be implemented in a computer-readable medium having instructions stored thereon to cause a UE to receive a configuration of an SRS resource, wherein the SRS resource comprises a set of symbols for transmission of SRS across a plurality of slots, and transmit the SRS using the set of symbols across the plurality of slots to a base station.

Certain aspects of the subject matter described in this disclosure can be implemented in a computer-readable medium having instructions stored thereon to cause an apparatus to transmit, to a UE, an indication of a configuration for an SRS resource, wherein the SRS resource comprises a set of symbols for transmission of SRS across a plurality of slots; and receive, from the UE, the SRS using the set of symbols across the plurality of slots.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
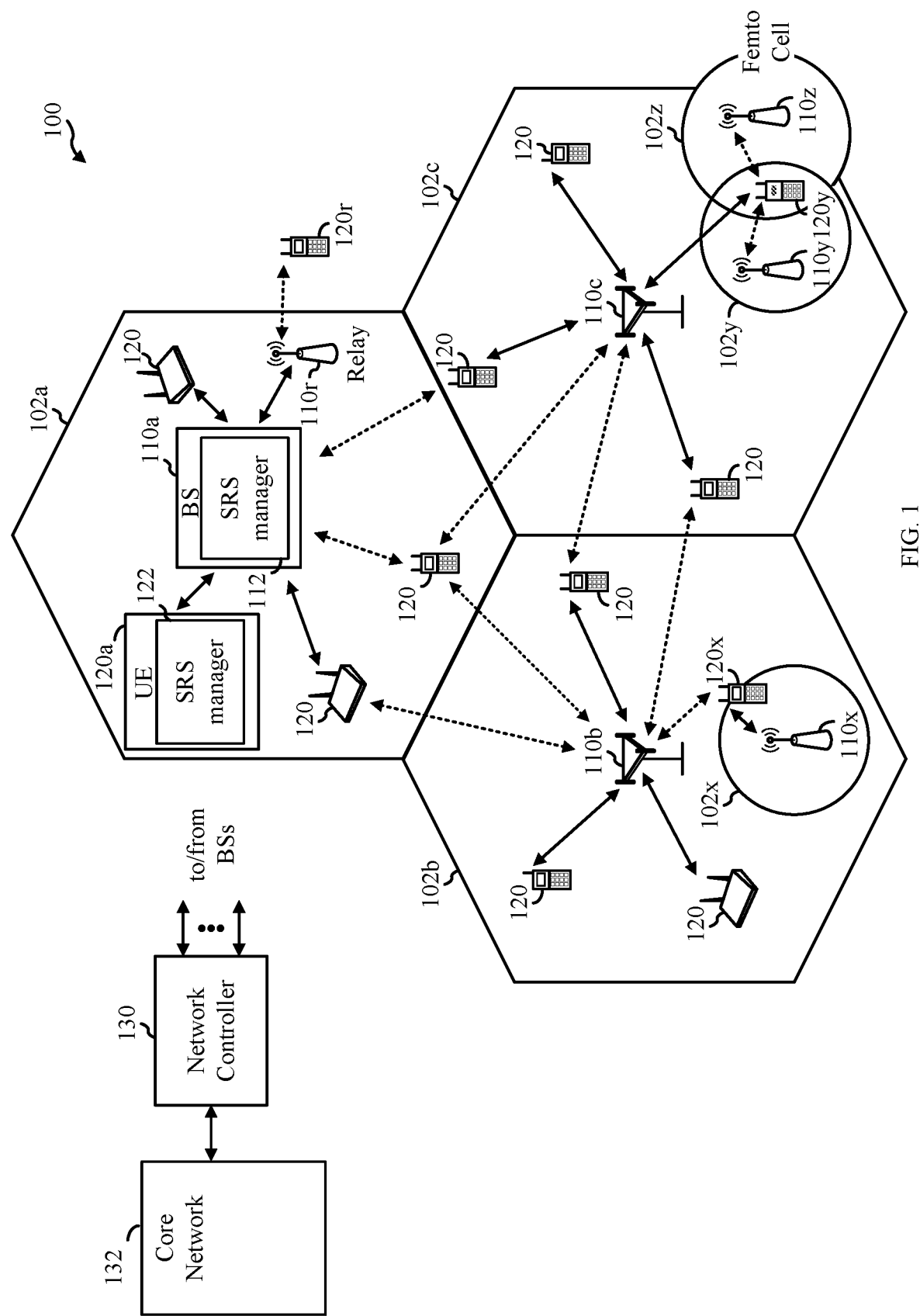
FIG. 1 is a block diagram conceptually illustrating an example telecommunications system, in accordance with certain aspects of the present disclosure.

Aspects of the present disclosure provide apparatus, methods, processing systems, and computer-readable mediums for sounding reference signal (SRS) resource configuration. For example, an SRS resource may be configured with symbols across multiple slots, enhancing coverage for communication. In some implementations, the number of symbols in each of the slots for the SRS resource may be different. In some aspects, the SRS resource may be configured per slot with frequency hopping, sequence-based hopping, or group-based hopping. For example, a slot may be configured with a greater number of hops as compared to another slot if, for example, the slot is subject to higher interference than the other slot.

In certain aspects, SRS may span different quantity of slots for different beams. For instance, an SRS resource may be configured with SRS spanning two slots for a first beam, but may be configured with SRS spanning three slots for a second beam. The number of slots that SRS on a beam may span may be determined based on a coverage associated with the beam. For example, a beam with lower coverage may be configured with SRS spanning a greater number of slots as compared to a beam with higher coverage, allowing a greater number of SRS repetitions for the beam with lower coverage. The aspects described herein improve coverage for SRS transmissions, increasing reliability and efficiency of communications.

The following description provides examples of techniques for sounding in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for sounding reference signal (SRS) resource configuration. As shown in FIG. 1, the BS 110a includes an SRS manager 112. The SRS manager 112 may be configured to determine a configuration of an SRS resource, wherein the SRS resource comprises a set of symbols for transmission of SRS across a plurality of slots, transmit, to a UE, an indication of the configuration for the SRS resource, and receive, from the UE, the SRS using the set of symbols across the plurality of slots, in accordance with aspects of the present disclosure. As shown in FIG. 1, the UE 120a includes an SRS manager 122. The SRS manager 122 may be configured to determine (e.g., receive) a configuration of an SRS resource, wherein the SRS resource comprises a set of symbols for transmission of SRS across a plurality of slots, and transmit the SRS using the set of symbols across the plurality of slots to a base station, in accordance with aspects of the present disclosure.

Figure 2:
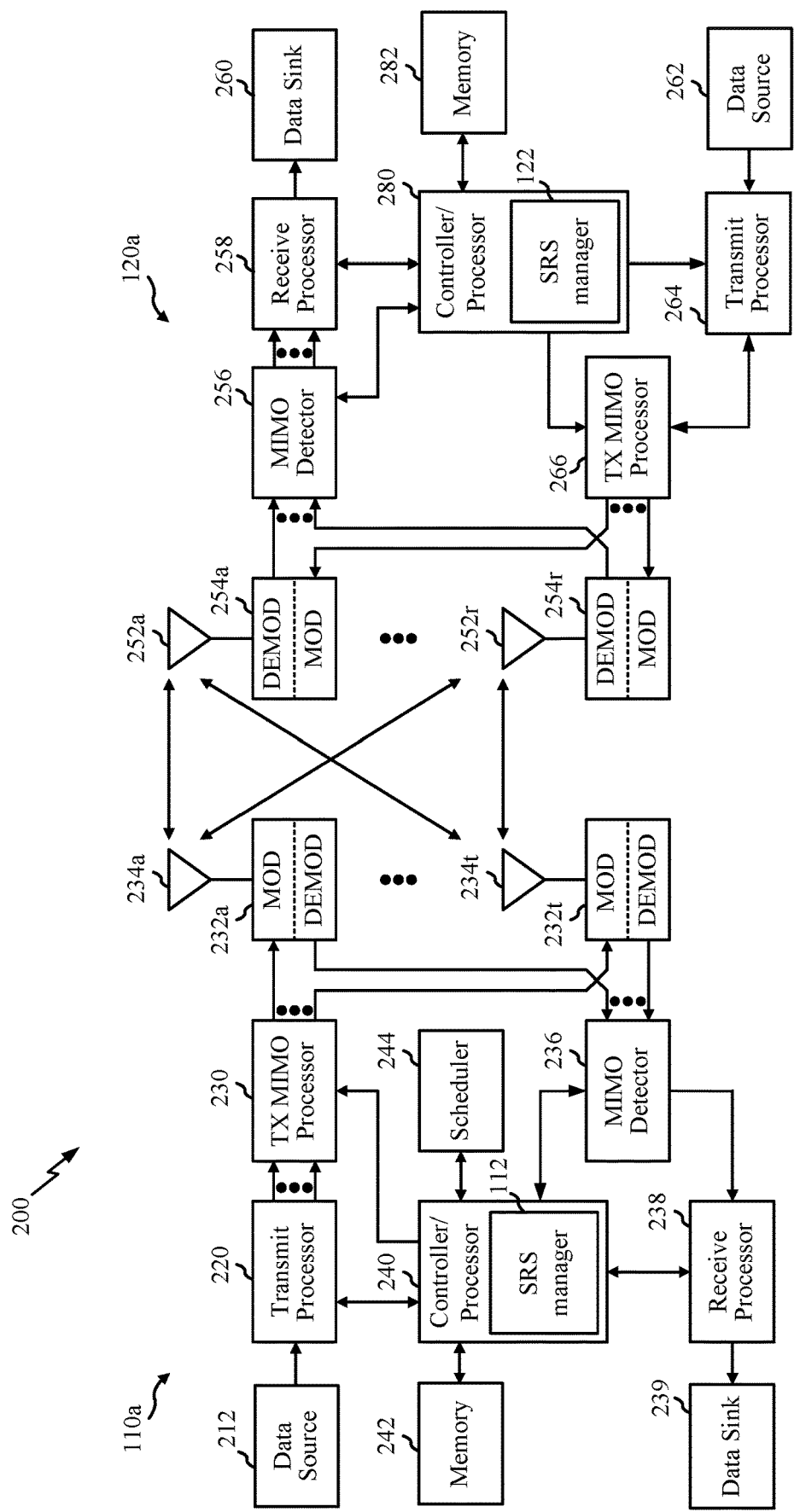
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has the SRS manager 112, according to aspects described herein. As shown in FIG. 2, the controller/processor 280 of the UE 120a has the SRS manager 122, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
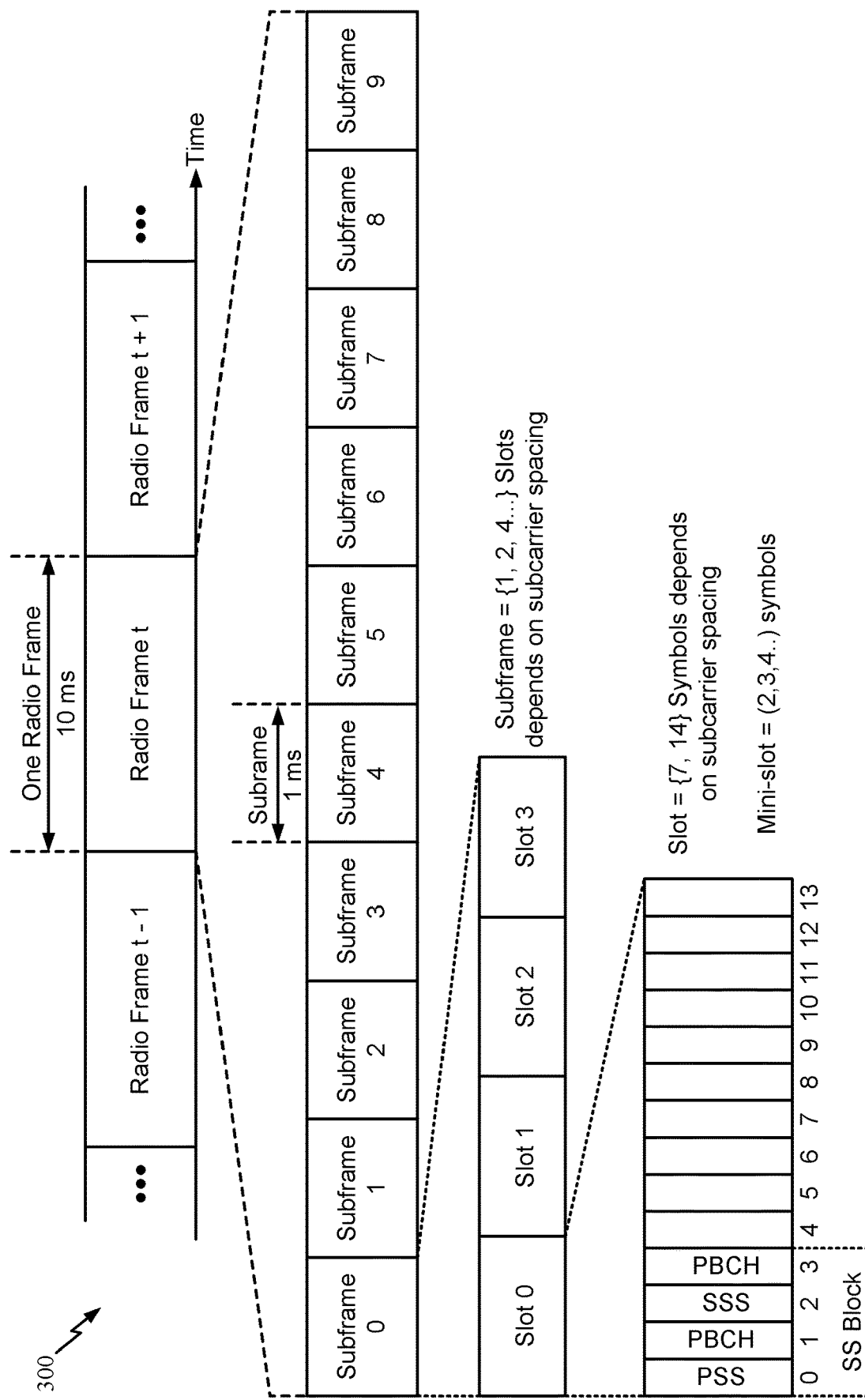
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

EXAMPLE MULTI-SLOT SOUNDING REFERENCE SIGNAL (SRS) RESOURCE

Certain aspects of the present disclosure are generally directed to techniques for enhancement of coverage by implementing a sounding reference signal (SRS) resources across multiple slots. Coverage enhancements may be achieved for SRS using intra-slot frequency hopping. Certain implementations have limitations with regards to the number of symbols that can be repeated for SRS if hopping is enabled, resulting in a reduction of coverage. For instance, the total number of SRS symbols may be constant, but the number of symbols per hop may be reduced. In certain aspects, the number of repeated symbols per hop may be increased to maintain the same coverage per frequency hop as in the case without hopping. For example, there may be 12 symbols per hop by implementing an SRS resource across multiple slots.

In other words, an SRS resource for an SRS transmission may span a number of symbols. A signal for the SRS may be repeated in each of the symbols associated with the SRS resource to improve coverage and reliability. For instance, an SRS resource may have eight symbols. Therefore, the same sequence may be repeated in each of the eight symbols. For intra-frequency hopping, the UE may be configured with a number of hops within a slot. For example, a resource set may be configured with eight symbols and four hops. Thus, the UE may transmit the SRS across eight symbols, where the sequence is repeated across the eight symbols, and with four hops. Thus, each of the four hops may have two symbols.

Figure 4:
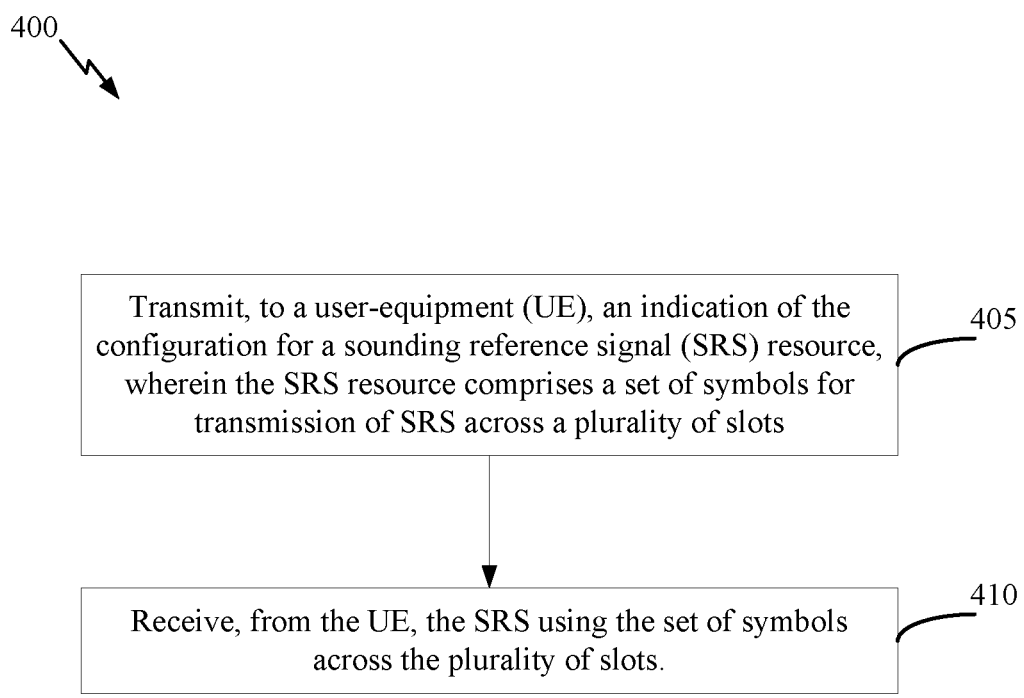
FIG. 4 is a flow diagram illustrating example operations for wireless communication by a BS, in accordance with certain aspects of the present disclosure.

FIG. 4 is a flow diagram illustrating example operations 400 for wireless communication, in accordance with certain aspects of the present disclosure. The operations 400 may be performed, for example, by a BS (e.g., such as the BS 110a in the wireless communication network 100).

Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400 may begin, at block 405, with the BS transmitting, to a UE, an indication of a configuration for an SRS resource, the SRS resource having a set of symbols for transmission of SRS across a plurality of slots. At block 415, the BS receives, from the UE, the SRS using the set of symbols across the plurality of slots.

Figure 5:
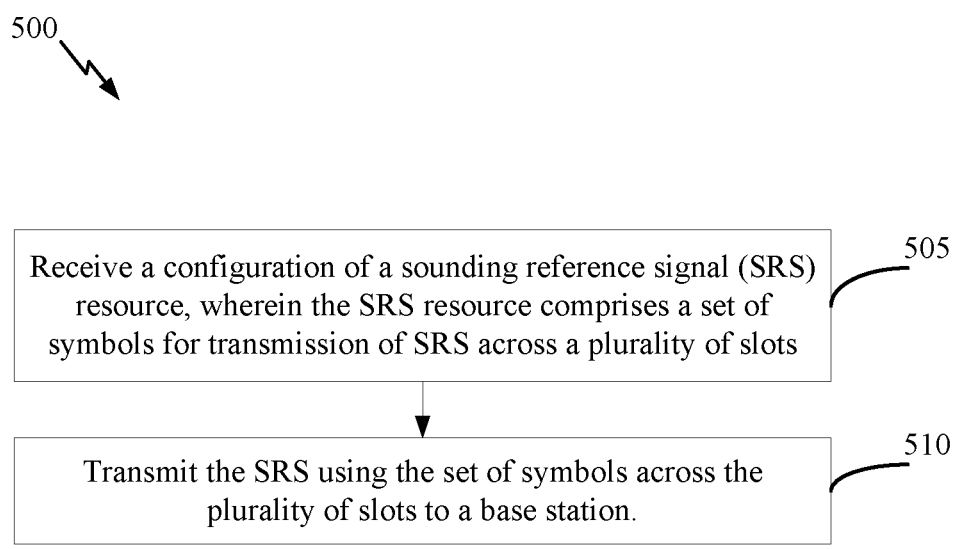
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., such as a UE 120a in the wireless communication network 100). The operations 500 may be complimentary operations by the UE to the operations 400 performed by the BS.

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, with the UE receives a configuration of an SRS resource, the SRS resource having a set of symbols for transmission of SRS across a plurality of slots. For instance, the UE may receive, from a base station, the configuration of the SRS resource.

At block 510, the UE may transmit the SRS using the set of symbols across the plurality of slots to a base station.

In some aspects, the configuration for the SRS resource may include a configuration for the transmission of SRS using frequency hopping across the plurality of slots. In some aspects, the configuration for the SRS resource may include a configuration for the transmission of SRS using a group or sequence-based hopping across the plurality of slots.

Figure 6A:
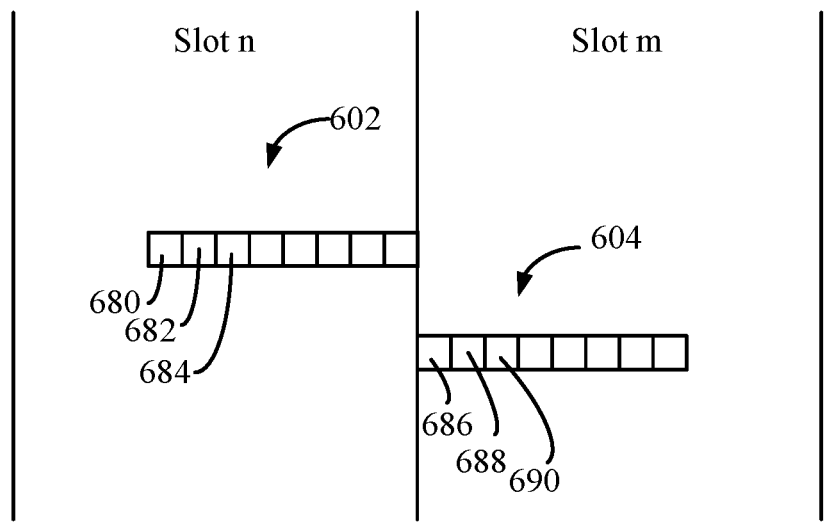
FIGS. 6A-6F illustrate various configurations of a sounding reference signal (SRS) resource across slots, in accordance with certain aspects of the present disclosure.

FIGS. 6A-6E illustrate various configurations of an SRS resource across slots, in accordance with certain aspects of the present disclosure. In some aspects, the set of symbols for the transmission of the SRS may include consecutive symbols spanning the plurality of slots. In other words, an SRS resource may be configured to span one or more slots. The SRS resource may use consecutive OFDM symbols across the slots. For example, as shown in FIG. 6A, the configured SRS resource includes symbols across slots, such as symbols 680, 682, 684 in slot n, and symbols 686, 688, 690 in slot m. The subset of symbols 602 for the SRS resource in slot n and the subset of symbols 604 in slot m are consecutive. In some aspects, the subset of symbols 602 and the subset of symbols 604 are on different frequency resources to implement inter-slot frequency hopping to increase coverage.

Figure 6B:
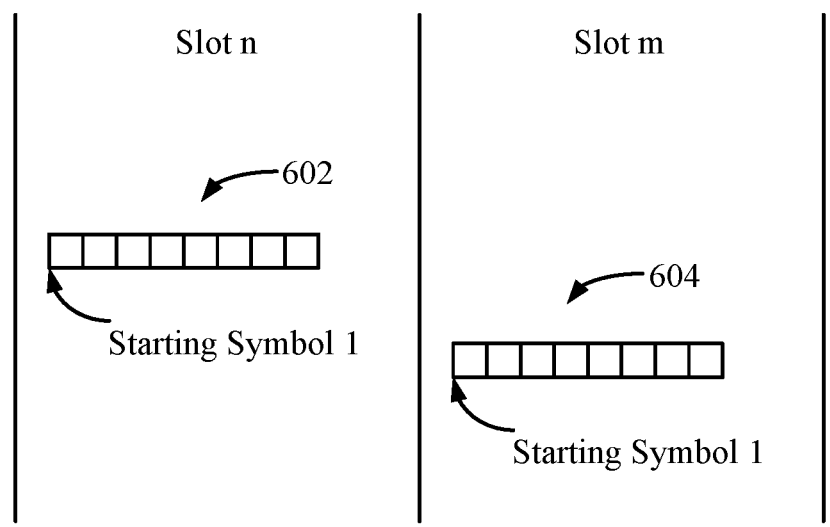

In some aspects, the set of symbols for the transmission of the SRS across the plurality of slots may include non-consecutive symbols. That is, the symbols of the SRS resource may not be consecutive across the slots. As illustrated in FIG. 6B, the subset of symbols 602 and the subset of symbols in 604 are non-consecutive. In this case, the same SRS resource starting OFDM symbol may be used for each of the slots. For instance, the subset of symbols 602 may start at symbol 1 of slot n, and the subset of symbols 604 may start at symbol 1 of slot m.

Figure 6C:
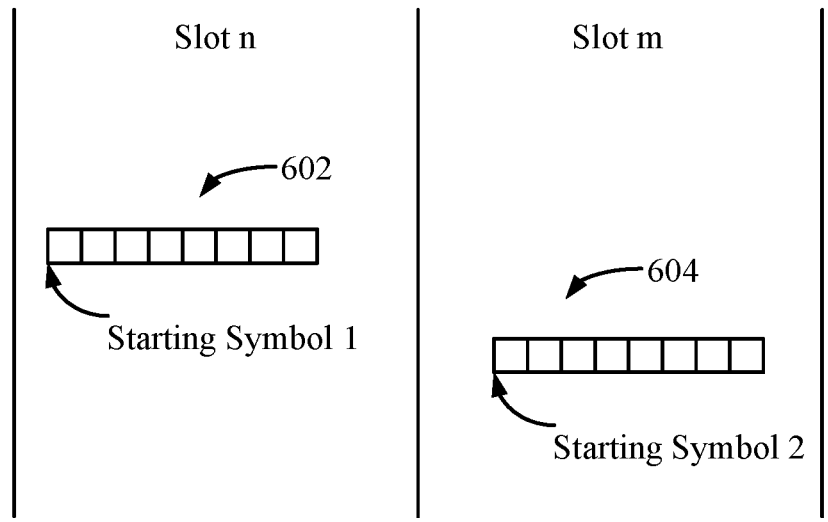
Figure 6D:
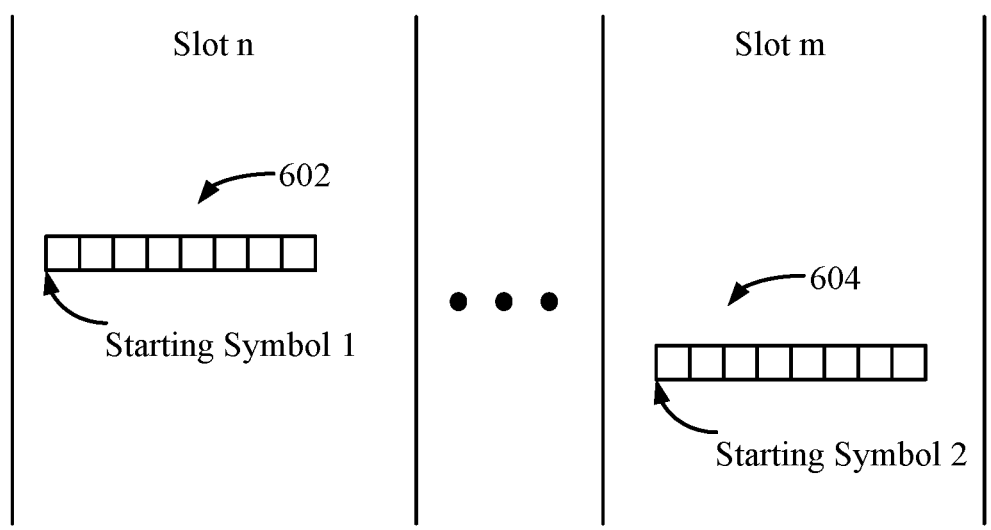

In another case, different SRS resource starting OFDM symbols may be configured for each of the slots. For example, as illustrated in FIG. 6C, the subset of symbols 602 in slot n may start at symbol 1 of slot n, whereas the subset of symbols 604 in slot m may start at symbol 2 of slot m. In certain aspects, the slots may or may not be consecutive. In other words, slots m and n may be consecutive slots as shown in FIG. 6C or non-consecutive slots as shown in FIG. 6D.

Figure 6E:
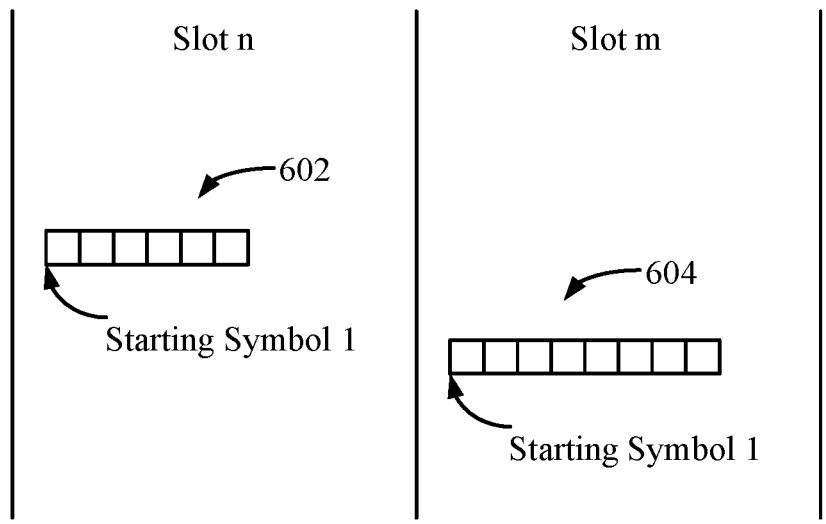
Figure 6F:
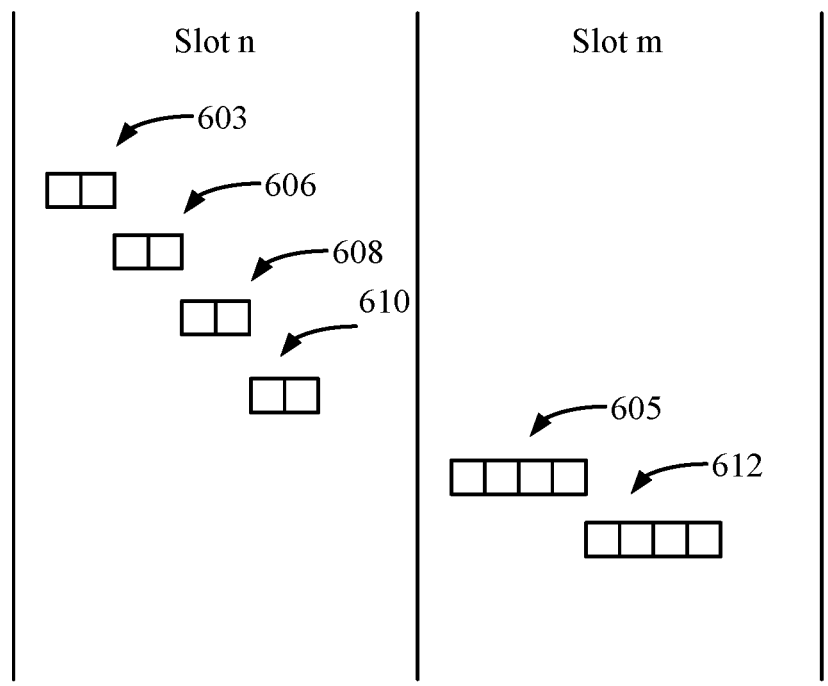

In certain aspects, the total number of OFDM symbols per slot may be different. For example, as illustrated in FIG. 6E, the subset of symbols 602 may include six symbols, whereas the subset of symbols 604 may include eight symbols. In some aspects, a different number of SRS transmissions or a different number of symbols per transmission, or both, may be configured. For example, as illustrated in FIG. 6F, there may be 4 SRS transmissions (e.g., 2 symbols each for 8 symbols total) in slot n and 2 SRS transmissions (4 symbols each for 8 symbols total) in slot m. In other words, there may be four frequency hops in slot 2 (e.g., four subsets of symbols 603, 606, 608, 610), each frequency hop in slot n being 2 symbols, and two frequency hops in slot m (e.g., subsets of symbols 605, 612), each frequency hop in slot m having 2 symbols.

In some aspects, a combination of inter-slot and intra-slot frequency hopping may be used for a multi-slot SRS resource. In other words, the configuration of the SRS resource may include a configuration for multiple hops in a slot (e.g., slot n in FIG. 6E) and multiple hops across slots (e.g., slots n and m in FIG. 6E).

In some aspects, group or sequence-based hopping may be configured individually per slot. For example, for slot n, there may be sequence-based hopping, but not for slot m. That is, if interference on some slots is higher, the UE may allocate sequence-based hopping for that slot to reduce interference with neighboring UEs that may be using the same sequences. Different sequences may be orthogonal. Therefore, hopping between sequences may increase the chances that neighboring UEs use orthogonal sequences when transmitting using the same resources.

In some implementations, the sequence of the SRS may be a Zadoff-Chu (ZC) sequence. Thus, a ZC group-based hopping may be implemented. For example, there may be a root associated with ZC, where a sequence for SRS may be determined based on a cyclic shift of the root. There may be a specific root configured for generating the ZC sequence. A group generally refers to a root for a ZC sequence. Thus, group-based hopping may involve using different roots for the sequence in each SRS transmission (e.g., in each hop).

In some aspects, the number of slots that the SRS spans may be different for different beams (e.g., within the same TRP or across TRPs of the same or different PCIs). For example, a first quantity of slots may be used for the transmission of the SRS using a first beam, and a second quantity of slots may be used for the transmission of the SRS using a second beam, the first quantity of slots being different than the second quantity of slots. The first beam and the second beam may be associated with the same transmission-reception point (TRP). In some aspects, the first beam and the second beam may be associated with different TRPs, the different TRPs being associated with the same physical cell identifier (PCI). In some aspects, the first beam and the second beam may be associated with different TRPs, the different TRPs being associated with different PCIs.

Figure 6G:
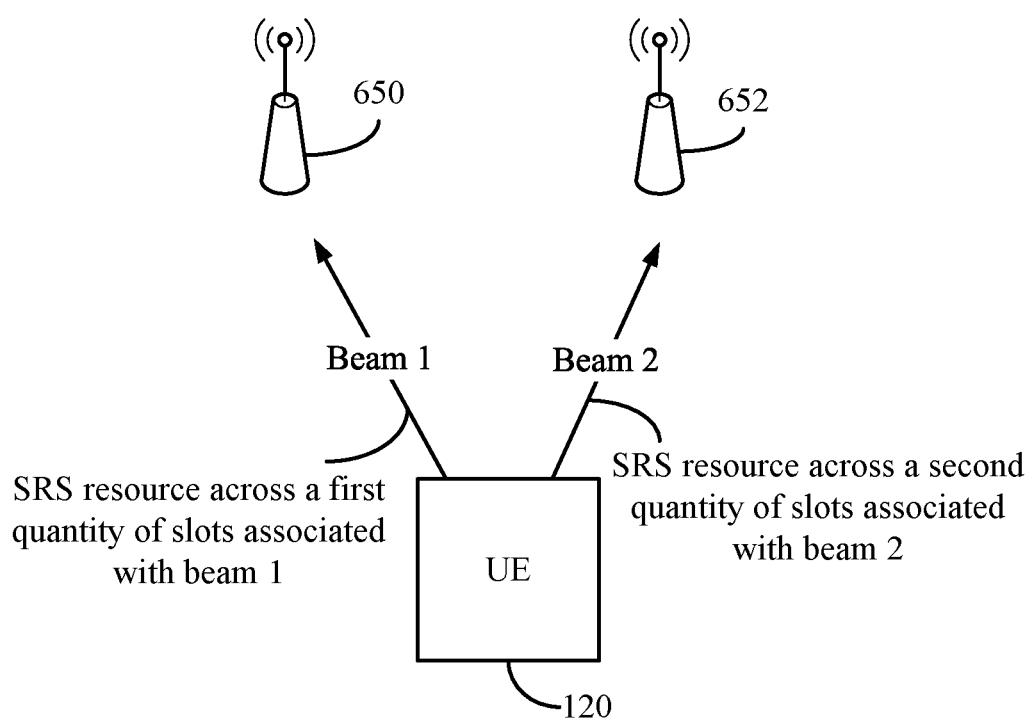
FIG. 6G illustrates transmission of SRS using different beams, in accordance with certain aspects of the present disclosure.

FIG. 6G illustrates beamforming for transmissions to TRPs, in accordance with certain aspects of the present disclosure. In some aspects, a number of slots for a beam may be determined (e.g., by the UE or configured by the BS) based the coverage associated with the beam. For example, a first beam may have greater coverage than a second beam. Therefore, a greater number of repetitions for SRS may be configured for the second beam, and as a result, an SRS symbols may span a greater number of slots. For example, as illustrated, beamforming may be used for transmissions to TRPs 650, 652. Beamforming generally refers to a process used to control the directionality of transmission and reception of radio signals. The beamforming process can help address the high path loss associated with communication at the millimeter-wave spectrum. A large number of antennas may be placed at each transceiver to exploit the beamforming gain for extending communication range. The same signal may be sent from each antenna in an array, but at slightly different times to implement beamforming.

Different coverage levels may be experienced by different beams, such as beam 1 to TRP 650 and beam 2 to TRP 652. In some cases, TRPs 650, 652 may be part of the same base station. The UE 120 may use a greater quantity of slots, facilitating a greater number of repetitions for SRS transmission, for one beam (e.g., beam 2) if the beam has a lower coverage level than another beam (e.g., beam 1).

Figure 7:
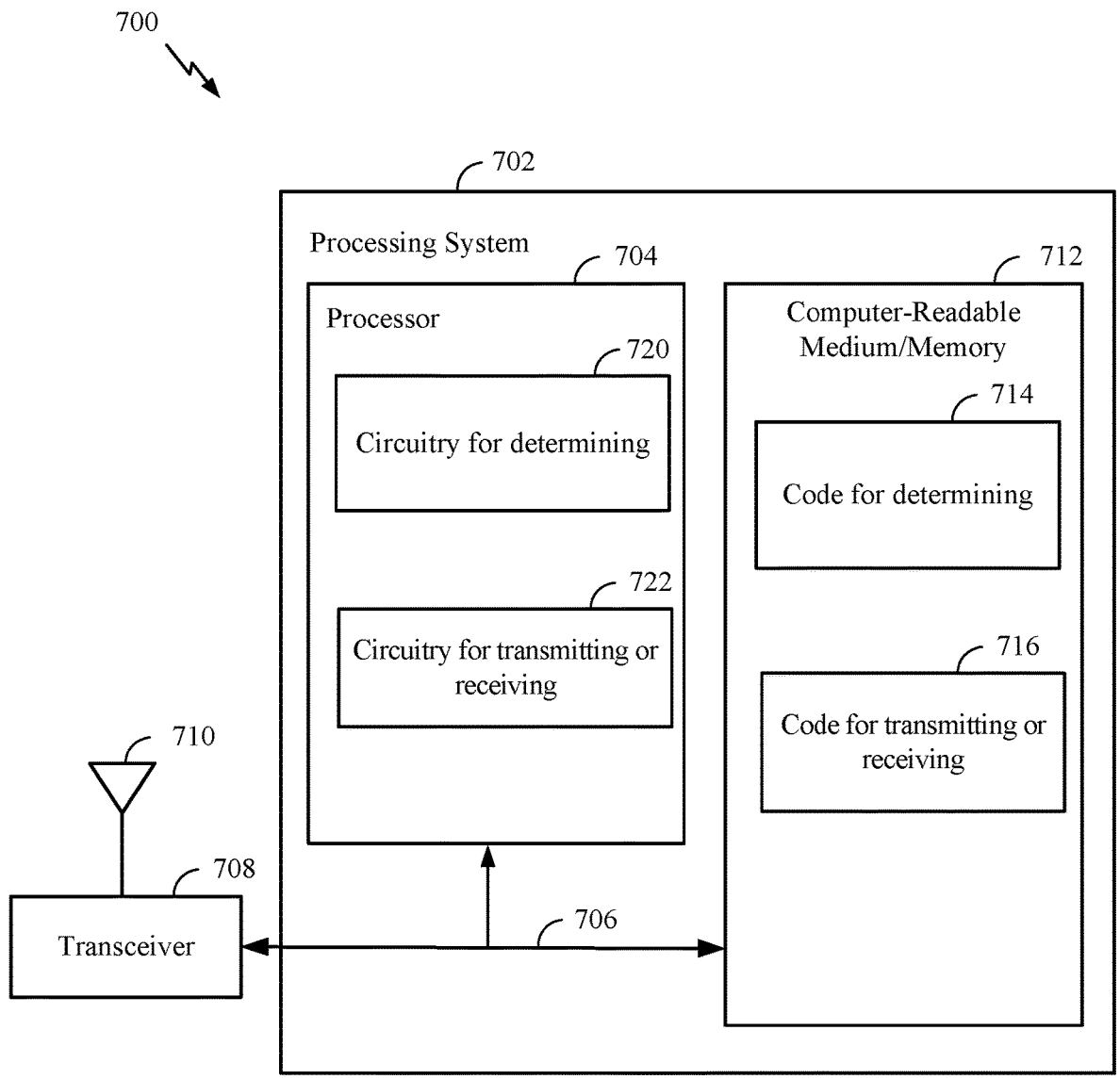
FIGS. 7 and 8 illustrate communications devices that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 4. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 4, or other operations for performing the various techniques discussed herein for sounding. In certain aspects, computer-readable medium/memory 712 stores code 714 (e.g., an example of means for) for determining; and code 716 (e.g., an example of means for) for receiving or transmitting. One or more of code 716, 716 may be executed by a general-purpose processor, a digital signal processor (DSP), an application-specific integrated circuit (ASIC), a field programmable gate array (FPGA) or other programmable logic device. In certain aspects, computer-readable medium/memory 712 is an example of the SRS manager 112.

In certain aspects, the processor 704 has circuitry configured to implement the code stored in the computer-readable medium/memory 712. The processor 704 includes circuitry 720 (e.g., an example of means for) for determining; and circuitry 722 (e.g., an example of means for) for receiving or transmitting. One or more of circuitry 720, 722 may be implemented by one or more of a general-purpose processor, a digital signal processor (DSP), an application-specific integrated circuit (ASIC), a field programmable gate array (FPGA) or other programmable logic device. In certain aspects, processor 704 is an example of the SRS manager 112.

The transceiver 708 may provide a means for receiving information such as packets, user data, or control information associated with various information channels (e.g., control channels, data channels, and information related to SRS, etc.). Information may be passed on to other components of the device 700. The transceiver 708 may be an example of aspects of the transceiver 254 described with reference to FIG. 2. The antenna 710 may correspond to a single antenna or a set of antennas. The transceiver 708 may provide means for transmitting signals generated by other components of the device 700.

Figure 8:
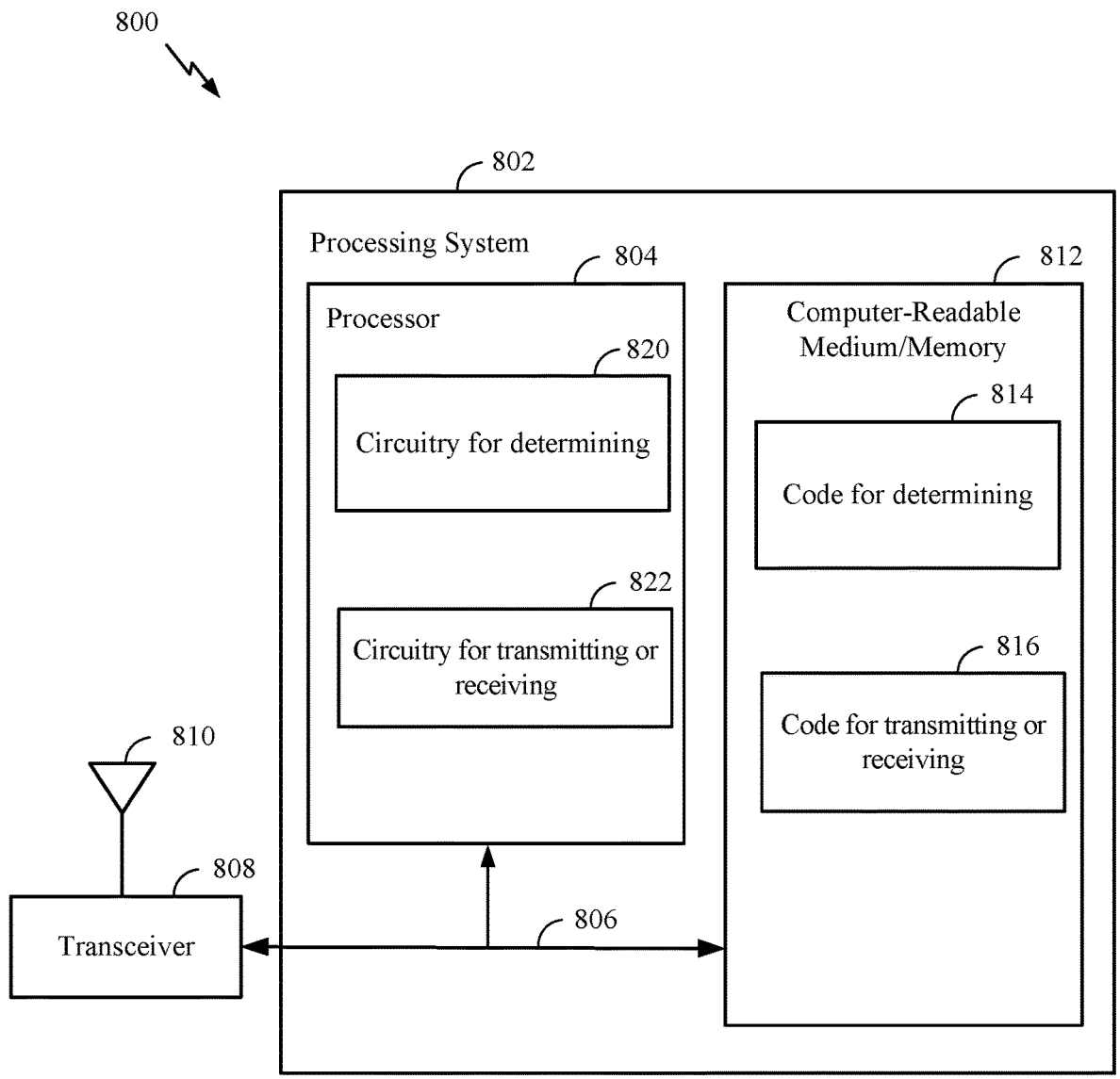

FIG. 8 illustrates a communications device 800 that may include various components (e.g., corresponding to means-plus-function components) configured to perform operations for the techniques disclosed herein, such as the operations illustrated in FIG. 5. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 5, or other operations for performing the various techniques discussed herein for sounding. In certain aspects, computer-readable medium/memory 812 stores code 814 (e.g., an example of means for) for determining; and code 816 (e.g., an example of means for) for receiving or transmitting. One or more of code 816, 816 may be executed by a general-purpose processor, a digital signal processor (DSP), an application-specific integrated circuit (ASIC), a field programmable gate array (FPGA) or other programmable logic device. In certain aspects, computer-readable medium/memory 812 is an example of the SRS manager 122.

In certain aspects, the processor 804 has circuitry configured to implement the code stored in the computer-readable medium/memory 812. The processor 804 includes circuitry 820 (e.g., an example of means for) for determining; and circuitry 822 (e.g., an example of means for) for receiving or transmitting. One or more of circuitry 820, 822 may be implemented by one or more of a general-purpose processor, a digital signal processor (DSP), an application-specific integrated circuit (ASIC), a field programmable gate array (FPGA) or other programmable logic device. In certain aspects, processor 804 is an example of the SRS manager 122.

The transceiver 808 may provide a means for receiving information such as packets, user data, or control information associated with various information channels (e.g., control channels, data channels, and information related to SRS, etc.). Information may be passed on to other components of the device 800. The transceiver 808 may be an example of aspects of the transceiver 254 described with reference to FIG. 2. The antenna 810 may correspond to a single antenna or a set of antennas. The transceiver 808 may provide means for transmitting signals generated by other components of the device 800.

EXAMPLE CLAUSES

Implementation examples are described in the following numbered clauses:

Clause 1. A method for wireless communication by a user-equipment (UE), comprising: receiving a configuration of a sounding reference signal (SRS) resource, wherein the SRS resource comprises a set of symbols for transmission of an SRS across a plurality of slots; and transmitting the SRS using the set of symbols across the plurality of slots to a base station.

Clause 2. The method of clause 1, wherein the configuration for the SRS resource comprises a configuration for the transmission of SRS using frequency hopping across the plurality of slots.

Clause 3. The method of clause 1, wherein the configuration for the SRS resource comprises a configuration for the transmission of SRS using a group or sequence-based hopping across the plurality of slots.

Clause 4. The method of clause 1, wherein the configuration of the SRS resource is received from the base station.

Clause 5. The method of clause 1, wherein the set of symbols for the transmission of the SRS comprises consecutive symbols spanning the plurality of slots.

Clause 6. The method of clause 1, wherein the set of symbols for the transmission of the SRS across the plurality of slots comprises non-consecutive symbols.

Clause 7. The method of clause 1, wherein the set of symbols comprises: a first subset of symbols in a first slot of the plurality of slots; and a second subset of symbols in a second slot of the plurality of slots, a starting symbol of the first subset of symbols in the first slot being the same as a starting symbol of the second subset of symbols in the second slot.

Clause 8. The method of clause 1, wherein the set of symbols comprises: a first subset of symbols in a first slot of the plurality of slots; and a second subset of symbols in a second slot of the plurality of slots, a starting symbol of the first subset of symbols in the first slot being different than a starting symbol of the second subset of symbols in the second slot.

Clause 9. The method of clause 1, wherein the plurality of slots comprises non-consecutive slots.

Clause 10. The method of clause 1, wherein the plurality of slots comprise consecutive slots.

Clause 11. The method of clause 1, wherein the set of symbols comprises: a first subset of symbols in a first slot of the plurality of slots; and a second subset of symbols in a second slot of the plurality of slots, a quantity of the first subset of symbols in the first slot being different than a quantity of the second subset of symbols in the second slot.

Clause 12. The method of clause 1, wherein the configuration of the SRS resource comprises: a configuration for transmission of the SRS using a first quantity of one or more first hops in a first slot of the plurality of slots; and a configuration for transmission of the SRS using a second quantity of one or more second hops in a second slot of the plurality of slots, the first quantity of the one or more first hops and the second quantity of the one or more second hops being different.

Clause 13. The method of clause 1, wherein the configuration of the SRS resource comprises a configuration for multiple hops in a slot of the plurality of slots and multiple hops across the plurality of slots.

Clause 14. The method of clause 1, wherein the configuration of the SRS resource comprises a configuration for a group or sequence-based hopping for the transmission of the SRS for at least one of the plurality of slots.

Clause 15. The method of clause 1, further comprising: determining a first quantity of slots for the transmission of the SRS using a first beam; and determining a second quantity of slots for the transmission of the SRS using a second beam, the first quantity of slots being different than the second quantity of slots.

Clause 16. The method of clause 15, wherein the first beam and the second beam are associated with the same transmission-reception point (TRP).

Clause 17. The method of clause 15, wherein the first beam and the second beam are associated with different TRPs, the different TRPs being associated with the same physical cell identifier (PCI).

Clause 18. The method of clause 15, wherein the first beam and the second beam are associated with different TRPs, the different TRPs being associated with different PCIs.

Clause 19. A method for wireless communication, comprising: transmitting, to a user-equipment (UE), an indication of a configuration for a sounding reference signal (SRS) resource, wherein the SRS resource comprises a set of symbols for transmission of SRS across a plurality of slots; and receiving, from the UE, the SRS using the set of symbols across the plurality of slots.

Clause 20. The method of clause 19, wherein the configuration for the SRS resource comprises a configuration for the transmission of SRS using frequency hopping across the plurality of slots.

Clause 21. The method of clause 19, wherein the configuration for the SRS resource comprises a configuration for the transmission of SRS using a group or sequence-based hopping across the plurality of slots.

Clause 22. The method of clause 19, wherein the set of symbols for the transmission of the SRS comprises consecutive symbols spanning the plurality of slots.

Clause 23. The method of clause 19, wherein the set of symbols for the transmission of the SRS across the plurality of slots comprises non-consecutive symbols.

Clause 24. The method of clause 19, wherein the set of symbols comprises: a first subset of symbols in a first slot of the plurality of slots; and a second subset of symbols in a second slot of the plurality of slots, a starting symbol of the first subset of symbols in the first slot being the same as a starting symbol of the second subset of symbols in the second slot.

Clause 25. The method of clause 19, wherein the set of symbols comprises: a first subset of symbols in a first slot of the plurality of slots; and a second subset of symbols in a second slot of the plurality of slots, a starting symbol of the first subset of symbols in the first slot being different than a starting symbol of the second subset of symbols in the second slot.

Clause 26. The method of clause 19, wherein the plurality of slots comprises non-consecutive slots.

Clause 27. The method of clause 19, wherein the plurality of slots comprise consecutive slots.

Clause 28. The method of clause 19, wherein the set of symbols comprises: a first subset of symbols in a first slot of the plurality of slots; and a second subset of symbols in a second slot of the plurality of slots, a quantity of the first subset of symbols in the first slot being different than a quantity of the second subset of symbols in the second slot.

Clause 29. The method of clause 19, wherein the configuration of the SRS resource comprises: a configuration for transmission of the SRS using a first quantity of one or more first hops in a first slot of the plurality of slots; and a configuration for transmission of the SRS using a second quantity of one or more second hops in a second slot of the plurality of slots, the first quantity of the one or more first hops and the second quantity of the one or more second hops being different.

Clause 30. The method of clause 19, wherein the configuration of the SRS resource comprises a configuration for multiple hops in a slot of the plurality of slots and multiple hops across the plurality of slots.

Clause 31. The method of clause 19, wherein the configuration of the SRS resource comprises a configuration for a group or sequence-based hopping for the transmission of the SRS for at least one of the plurality of slots.

Clause 32. The method of clause 19, wherein a first quantity of slots for the transmission of the SRS using a first beam is different than a second quantity of slots for the transmission of the SRS using a second beam.

Clause 33. The method of clause 32, wherein the first beam and the second beam are associated with the same transmission-reception point (TRP).

Clause 34. The method of clause 32, wherein the first beam and the second beam are associated with different TRPs, the different TRPs being associated with the same physical cell identifier (PCI).

Clause 35. The method of clause 32, wherein the first beam and the second beam are associated with different TRPs, the different TRPs being associated with different PCIs.

Clause 36: An apparatus, comprising: a memory comprising executable instructions; one or more processors configured to execute the executable instructions and cause the apparatus to perform a method in accordance with any one of Clauses 1-35.

Clause 37: An apparatus, comprising means for performing a method in accordance with any one of Clauses 1-35.

Clause 38: A non-transitory computer-readable medium comprising executable instructions that, when executed by one or more processors of an apparatus, cause the apparatus to perform a method in accordance with any one of Clauses 1-35.

Clause 39: A computer program product embodied on a computer-readable storage medium comprising code for performing a method in accordance with any one of Clauses 1-35.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4 and FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication by a user-equipment (UE), comprising:
  a memory; and
  one or more processors coupled to the memory, the memory and the one or more processors, individually or collectively, being configured to:
    receive a configuration of a sounding reference signal (SRS) resource, wherein the SRS resource comprises a set of symbols for transmission of an SRS across a plurality of slots;
    determine, by the UE, a first quantity of slots of the plurality of slots for the transmission of the SRS using a first beam;
    determine, by the UE, a second quantity of slots of the plurality of slots for the transmission of the SRS using a second beam, the first quantity of slots being different than the second quantity of slots; and
    transmit the SRS using the set of symbols across the plurality of slots to a base station, wherein the set of symbols for the transmission of the SRS comprises consecutive symbols spanning the plurality of slots.

2. The apparatus of claim 1, wherein the configuration for the SRS resource comprises a configuration for the transmission of SRS using frequency hopping across the plurality of slots.

3. The apparatus of claim 1, wherein the configuration for the SRS resource comprises a configuration for the transmission of SRS using a group or sequence-based hopping across the plurality of slots.

4. The apparatus of claim 1, wherein the configuration of the SRS resource is received from the base station.

5. The apparatus of claim 1, wherein the set of symbols comprises:
  a first subset of symbols in a first slot of the plurality of slots; and
  a second subset of symbols in a second slot of the plurality of slots, a starting symbol of the first subset of symbols in the first slot being the same as a starting symbol of the second subset of symbols in the second slot.

6. The apparatus of claim 1, wherein the set of symbols comprises:
  a first subset of symbols in a first slot of the plurality of slots; and
  a second subset of symbols in a second slot of the plurality of slots, a starting symbol of the first subset of symbols in the first slot being different than a starting symbol of the second subset of symbols in the second slot.

7. The apparatus of claim 1, wherein the plurality of slots comprise consecutive slots.

8. The apparatus of claim 1, wherein the set of symbols comprises:
  a first subset of symbols in a first slot of the plurality of slots; and
  a second subset of symbols in a second slot of the plurality of slots, a quantity of the first subset of symbols in the first slot being different than a quantity of the second subset of symbols in the second slot.

9. The apparatus of claim 1, wherein the configuration of the SRS resource comprises:
   a configuration for transmission of the SRS using a first quantity of one or more first hops in a first slot of the plurality of slots; and
   a configuration for transmission of the SRS using a second quantity of one or more second hops in a second slot of the plurality of slots, the first quantity of the one or more first hops and the second quantity of the one or more second hops being different.

10. The apparatus of claim 1, wherein the configuration of the SRS resource comprises a configuration for multiple hops in a slot of the plurality of slots and multiple hops across the plurality of slots.

11. The apparatus of claim 1, wherein the configuration of the SRS resource comprises a configuration for a group or sequence-based hopping for the transmission of the SRS for at least one of the plurality of slots.

12. The apparatus of claim 1, wherein the first beam and the second beam are associated with the same transmission-reception point (TRP).

13. The apparatus of claim 1, wherein the first beam and the second beam are associated with different TRPs, the different TRPs being associated with the same physical cell identifier (PCI).

14. The apparatus of claim 1, wherein the first beam and the second beam are associated with different TRPs, the different TRPs being associated with different PCIs.

15. An apparatus for wireless communication, comprising:
   a memory; and
   one or more processors coupled to the memory, the memory and the one or more processors, individually or collectively, being configured to:
      transmit, to a user-equipment (UE), an indication of a configuration for a sounding reference signal (SRS) resource, wherein the SRS resource comprises a set of symbols for reception of SRS across a plurality of slots; and
      receive, from the UE, the SRS using the set of symbols across the plurality of slots, wherein the set of symbols for the reception of the SRS comprises consecutive symbols spanning the plurality of slots, wherein a first quantity of slots for the transmission of the SRS using a first beam is different than a second quantity of slots for the transmission of the SRS using a second beam.

16. The apparatus of claim 15, wherein the configuration for the SRS resource comprises a configuration for the transmission of SRS using frequency hopping across the plurality of slots.

17. The apparatus of claim 15, wherein the configuration for the SRS resource comprises a configuration for the transmission of SRS using a group or sequence-based hopping across the plurality of slots.

18. The apparatus of claim 15, wherein the set of symbols comprises:
   a first subset of symbols in a first slot of the plurality of slots; and
   a second subset of symbols in a second slot of the plurality of slots, a starting symbol of the first subset of symbols in the first slot being the same as a starting symbol of the second subset of symbols in the second slot.

19. The apparatus of claim 15, wherein the set of symbols comprises:
   a first subset of symbols in a first slot of the plurality of slots; and
   a second subset of symbols in a second slot of the plurality of slots, a starting symbol of the first subset of symbols in the first slot being different than a starting symbol of the second subset of symbols in the second slot.

20. The apparatus of claim 17, wherein the plurality of slots comprise consecutive slots.

21. The apparatus of claim 15, wherein the set of symbols comprises:
   a first subset of symbols in a first slot of the plurality of slots; and
   a second subset of symbols in a second slot of the plurality of slots, a quantity of the first subset of symbols in the first slot being different than a quantity of the second subset of symbols in the second slot.

22. The apparatus of claim 15, wherein the configuration of the SRS resource comprises:
   a configuration for transmission of the SRS using a first quantity of one or more first hops in a first slot of the plurality of slots; and
   a configuration for transmission of the SRS using a second quantity of one or more second hops in a second slot of the plurality of slots, the first quantity of the one or more first hops and the second quantity of the one or more second hops being different.

23. The apparatus of claim 15, wherein the configuration of the SRS resource comprises a configuration for multiple hops in a slot of the plurality of slots and multiple hops across the plurality of slots.

24. The apparatus of claim 15, wherein the configuration of the SRS resource comprises a configuration for a group or sequence-based hopping for the transmission of the SRS for at least one of the plurality of slots.

25. A method for wireless communication by a user-equipment (UE), comprising:
   receiving a configuration of a sounding reference signal (SRS) resource, wherein the SRS resource comprises a set of symbols for transmission of an SRS across a plurality of slots;
   determining, by the UE, a first quantity of slots of the plurality of slots for the transmission of the SRS using a first beam;
   determining, by the UE, a second quantity of slots of the plurality of slots for the transmission of the SRS using a second beam, the first quantity of slots being different than the second quantity of slots; and
   transmitting the SRS using the set of symbols across the plurality of slots to a base station, wherein the set of symbols for the reception of the SRS comprises consecutive symbols spanning the plurality of slots.

26. A method for wireless communication, comprising:
   transmitting, to a user-equipment (UE), an indication of a configuration for a sounding reference signal (SRS) resource, wherein the SRS resource comprises a set of symbols for transmission of SRS across a plurality of slots; and
   receiving, from the UE, the SRS using the set of symbols across the plurality of slots, wherein the set of symbols for the reception of the SRS comprises consecutive symbols spanning the plurality of slots, wherein a first quantity of slots for the transmission of the SRS using a first beam is different than a second quantity of slots for the transmission of the SRS using a second beam.

* * * * *